United States Patent [19]
Tozu et al.

[11] Patent Number: 5,927,830
[45] Date of Patent: Jul. 27, 1999

[54] VEHICLE MOTION CONTROL SYSTEM FOR IMMEDIATELY TERMINATING BRAKING CONTROL WHEN THE VEHICLE ENTERS ONTO A STEPPED OR ROUGH ROAD

[75] Inventors: Kenji Tozu, Yokkaichi; Yoshiyuki Yasui, Kariya; Masanobu Fukami, Hazu gun; Takayuki Itoh, Nagoya; Norio Yamazaki, Kariya, all of Japan

[73] Assignee: Aisin Seiki Kabushiki Kaisha, Kariya, Japan

[21] Appl. No.: 08/757,770

[22] Filed: Nov. 27, 1996

[30] Foreign Application Priority Data

Nov. 30, 1995  [JP]  Japan ................. 7-337832

[51] Int. Cl.⁶ ................................. B60T 8/60
[52] U.S. Cl. ................. 303/155; 303/163; 303/166; 303/174
[58] Field of Search ................. 303/155, 166, 303/163, 174, DIG. 163, DIG. 164, 113.4, 165, 146, 147

[56] References Cited

U.S. PATENT DOCUMENTS

| | | |
|---|---|---|
| 4,898,431 | 2/1990 | Karnopp et al. . |
| 5,172,318 | 12/1992 | Meissner et al. . |
| 5,220,506 | 6/1993 | Kuwana et al. . |
| 5,286,099 | 2/1994 | Fujita et al. ............... 303/166 |
| 5,433,513 | 7/1995 | Takayama ................. 303/155 |
| 5,435,635 | 7/1995 | Watanabe .................. 303/166 |
| 5,474,369 | 12/1995 | Inagaki et al. ............. 303/155 |
| 5,494,345 | 2/1996 | Inagaki et al. . |
| 5,505,532 | 4/1996 | Tozu et al. . |
| 5,518,307 | 5/1996 | Okazaki .................. 303/166 |
| 5,570,935 | 11/1996 | Monzaki ................. 303/155 |

FOREIGN PATENT DOCUMENTS

| | | |
|---|---|---|
| 44 38 148 | 4/1995 | Germany . |
| 196 26 398 | 1/1997 | Germany . |
| 195 38 545 | 4/1997 | Germany . |
| 2-151556 | 6/1990 | Japan . |
| 4-257757 | 9/1992 | Japan . |

OTHER PUBLICATIONS

Van Zanten et al., "FDR—Die Fahrdynamikregelung von Bosch", *ATZ Automobiltechnische Zeitschrfit* 96 (1994) II, pp. 674–689.

*Primary Examiner*—Matthew C. Graham
*Attorney, Agent, or Firm*—Burns, Doane, Swecker & Mathis, L.L.P.

[57] ABSTRACT

The present invention is directed to a vehicle motion control system for maintaining vehicle stability by controlling the braking force applied to at least one wheel of a vehicle. A vehicle condition monitor is provided for monitoring a condition of the vehicle in motion. The braking force is applied by a braking apparatus to each wheel in response to depression of a brake pedal, and on the basis of an output of the monitor and irrespective of depression of the brake pedal. A control variable is provided for actuating the braking apparatus and set in accordance with at least a first parameter (e.g., wheel acceleration) and a second parameter (e.g., slip rate) which are provided on the basis of the output of the monitor, respectively, so that the control variable is varied in response to the output of the monitor. The control variable is integrated during the braking apparatus is actuated. The actuation of the braking apparatus starts when the control variable exceeds a predetermined level in magnitude, and is terminated when the control variable is within a predetermined zone provided in accordance with the first parameter and the second parameter, and when the controlled variable is less than a predetermined value.

7 Claims, 9 Drawing Sheets

VEHICLE MOTION CONTROL SYSTEM FOR IMMEDIATELY TERMINATING BRAKING CONTROL WHEN THE VEHICLE ENTERS ONTO A STEPPED OR ROUGH ROAD

BACKGROUND OF THE INVENTION

1. Field of the Invention

The present invention relates to a vehicle motion control system for controlling vehicle motion, and more particularly to the control system which performs an anti-skid control to prevent a wheel from being locked during braking, by controlling the braking force applied to the wheel, and which also performs a steering control by braking to restrain an excessive oversteer and excessive understeer which will occur during, for example, cornering, by applying a braking force to each wheel of the vehicle irrespective of depression of a brake pedal.

2. Description of the Related Arts

According to a prior anti-skid control system, if a jumping or turning motion of a vehicle occurred during braking, an anti-skid control would be initiated earlier than the control should start in accordance with locking condition of a wheel, as described in the U.S. Pat. No. 5,505,532, for example. In order to prevent the anti-skid control from being initiated by an instantaneous decrease of load which occurs when the vehicle jumps or turns during braking, the publication proposes an anti-skid control system which measures the load applied to the vehicle, and provides a slower response for starting the anti-skid control as the load becomes lower.

Recently, a vehicle motion control system is proposed for controlling the braking force applied to each wheel of the vehicle irrespective of depression of a brake pedal to maintain vehicle stability. According to the vehicle motion control system, if the vehicle is braked in response to depression of the brake pedal during the vehicle is running on a stepped road or a rough road, for example, the anti-skid control might be initiated earlier than the control should start, as described above. In order to avoid this, when the vehicle is running on the stepped road or rough road, a relatively slow response is provided for starting the anti-skid control, in general, as described in the publication.

According to the system as disclosed in the publication, however, the determination of the stepped or rough road is made on the basis of the load applied to the vehicle, so that it is not easy to avoid a delay in starting the anti-skid operation when the vehicle is running on a normal road. To avoid this delay, if a relatively fast response is provided for starting the anti-skid control, the control will be initiated immediately when the vehicle enters onto the stepped or rough road. As a result, it is difficult to solve the above-described problem by changing a condition for starting the anti-skid control, and the same is true of various vehicle motion control modes such as the steering control by braking including an oversteer restraining control and an understeer restraining control, a front-rear braking force distribution control and the like.

SUMMARY OF THE INVENTION

Accordingly, it is an object of the present invention to provide a vehicle motion control system which immediately terminates a vehicle motion control such as an anti-skid control when a vehicle enters onto a stepped road, a rough road and the like.

It is another object of the present invention to provide a vehicle motion control system which easily monitors a vehicle condition and determines a necessity to terminate the vehicle motion control even when the vehicle enters onto the stepped road, rough road and the like.

In accomplishing the above and other objects, a vehicle motion control system is provided for maintaining stability of an automotive vehicle when the vehicle in motion, by controlling a braking force applied to the front and rear wheels of the vehicle. In the system, vehicle condition monitor means is provided for monitoring a condition of the vehicle in motion. Braking means is provided for applying a braking force to each wheel of the vehicle, and adapted to be actuated in response to depression of a brake pedal, and actuated on the basis of an output of the monitor means and irrespective of depression of the brake pedal. Control variable setting means is adapted to set a control variable for actuating the braking means, in accordance with at least a first parameter and a second parameter provided on the basis of the output of the monitor means, respectively. The control variable is varied in response to the output of the monitor means. Also, controlled variable calculating means is adapted to integrate the control variable in response to the output of the monitor means, during the braking means is actuated, to provide a controlled variable. Then, starting means is provided for starting the actuation of the braking means when the control variable varied in response to the output of the monitor means exceeds a predetermined level in magnitude. And, terminating means is provided for determining if the control variable varied in response to the output of the monitor means is within a predetermined zone provided in accordance with the first parameter and the second parameter, and terminating the actuation of the braking means when the control variable is within the predetermined zone, and when the controlled variable provided by the controlled variable calculating means is less than a predetermined value.

Preferably, the vehicle condition monitor means includes wheel speed detection means for detecting a wheel speed of each wheel of the front and rear wheels, wheel acceleration calculating means for calculating a wheel acceleration of each wheel on the basis of the output of the wheel speed detection means, and slip rate calculating means for calculating a slip rate of each wheel on the basis of the output signal of the wheel speed detection means. It is preferable that the wheel acceleration is provided for the first parameter, and the slip rate is provided for the second parameter.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENT

Figure 1:
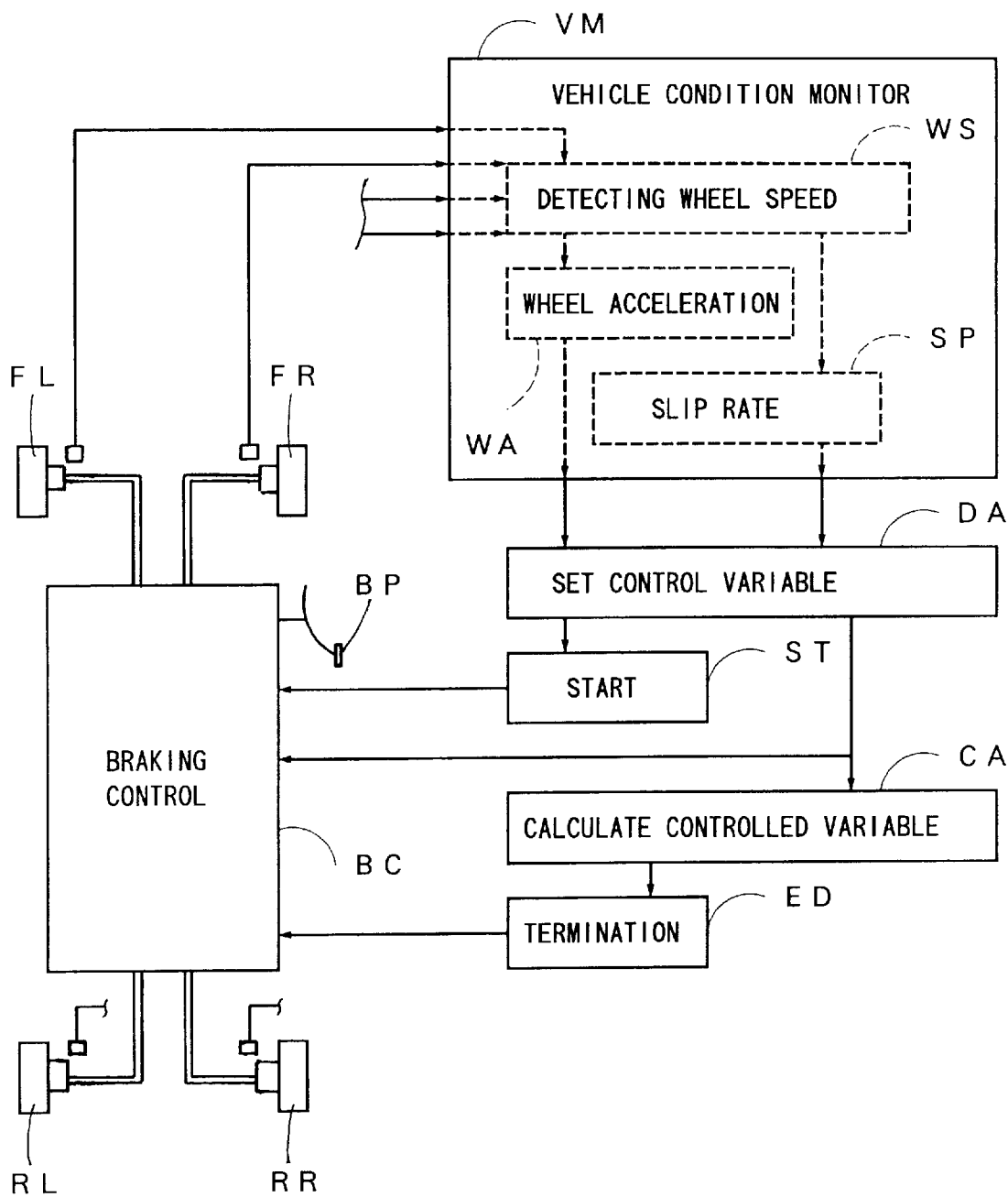
FIG. 1 is a general block diagram illustrating a vehicle motion control system according to the present invention.

Referring to FIG. 1, there is schematically illustrated a vehicle motion control system according to the present invention, which controls a braking force applied to front wheels FL, FR and rear wheels RL, RR of a vehicle individually. A vehicle condition monitor VM is provided for monitoring a condition of the vehicle in motion. A braking control apparatus PC is provided for applying the braking force to each wheel in response to depression of a brake pedal BP, and applying the braking force on the basis of an output of the monitor VM and irrespective of depression of the brake pedal BP. A control variable setting unit DA sets a control variable for actuating the braking control apparatus PC, in accordance with at least a first parameter and a second parameter provided on the basis of the output of the monitor VM, respectively. Thus, the braking control apparatus PC is adapted to be actuated in response to the control variable. A controlled variable calculating unit CA integrates the control variable varied in response to the output of the monitor VM, during the braking control apparatus PC is actuated, to provide a controlled variable. A starting unit ST is provided for starting the actuation of the braking control apparatus PC when the control variable varied in response to the output of the monitor VM exceeds a predetermined level in magnitude. And, a terminating unit ED is provided for determining if the control variable varied in response to the output of the monitor VM is within a predetermined zone provided in accordance with the first parameter and the second parameter, and terminating the actuation of the braking control apparatus PC when the control variable is within the predetermined zone, and when the controlled variable provided by the controlled variable calculating unit CA is less than a predetermined value.

In the vehicle condition monitor VM, a wheel speed detection unit WS is provided for detecting each wheel speed of the front and rear wheels, a wheel acceleration calculating unit WA is provided for calculating a wheel acceleration of each wheel on the basis of the output signal of the wheel speed detection unit WS, and slip rate calculating unit SP is provided for calculating a slip rate of each wheel on the basis of the output signal of the wheel speed detection unit WS. According to the present embodiment, the wheel acceleration is provided for the first parameter, and the slip rate is provided for the second parameter.

Figure 2:
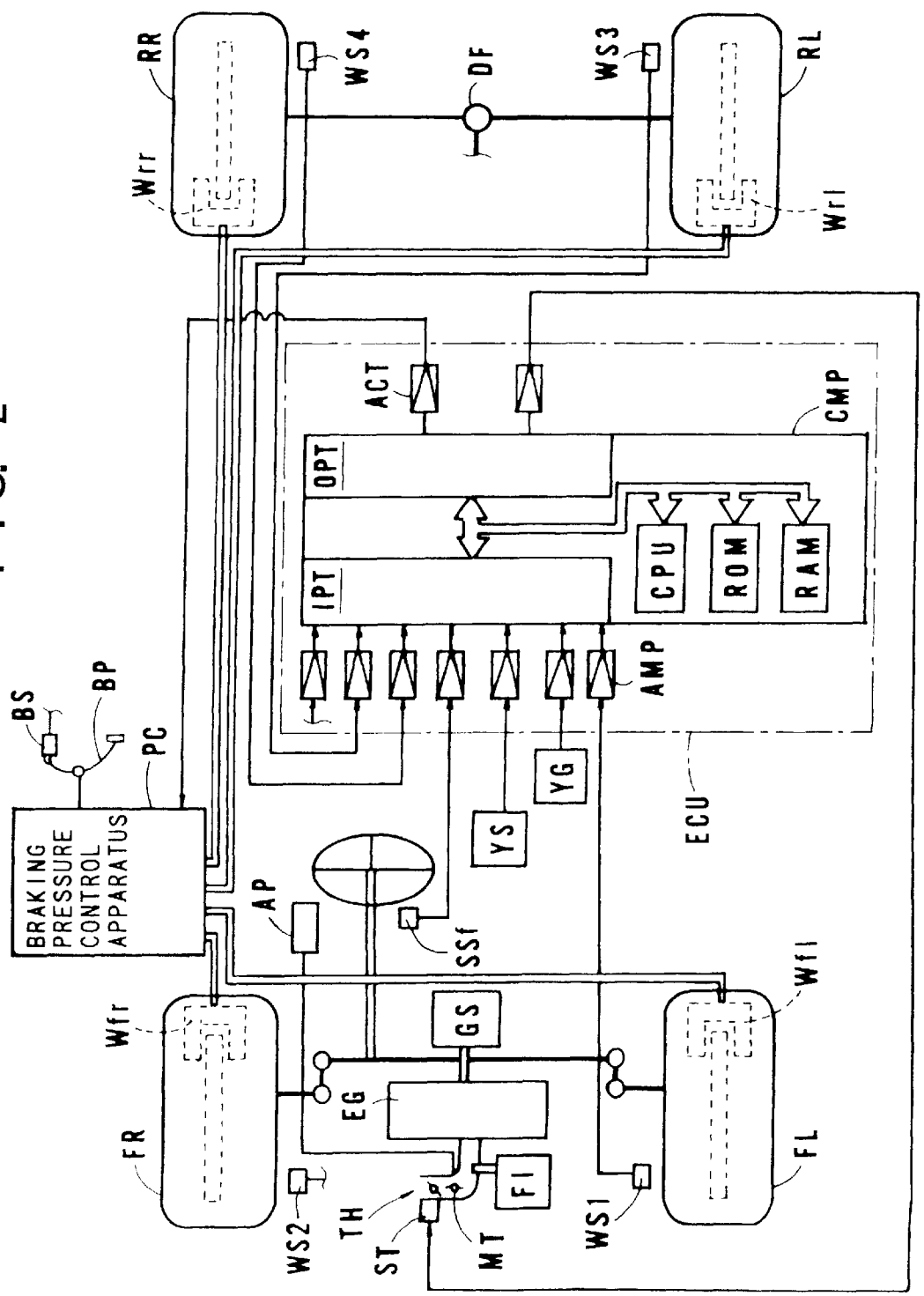
FIG. 2 is a schematic block diagram of a vehicle motion control system of an embodiment of the present invention.

More specifically, the details of the embodiment disclosed in FIG. 1 are illustrated in FIGS. 2 to 10. As shown in FIG. 2, the vehicle has an engine EG provided with a fuel injection apparatus FI and a throttle control apparatus TH which is arranged to control a main throttle opening of a main throttle valve MT in response to operation of an accelerator valve AP. The throttle control apparatus TH has a sub-throttle valve ST which is actuated in response to an output signal of an electronic controller ECU to control a sub-throttle opening. Also, the fuel injection apparatus FI is actuated in response to an output signal of the electronic controller ECU to control the fuel injected into the engine EG. According to the present embodiment, the engine EG is operatively connected with the rear wheels RL, RR through a transmission GS and a differential gear DF to provide a rear-drive system, but the present embodiment is not limited to the rear-drive system.

Figure 10:
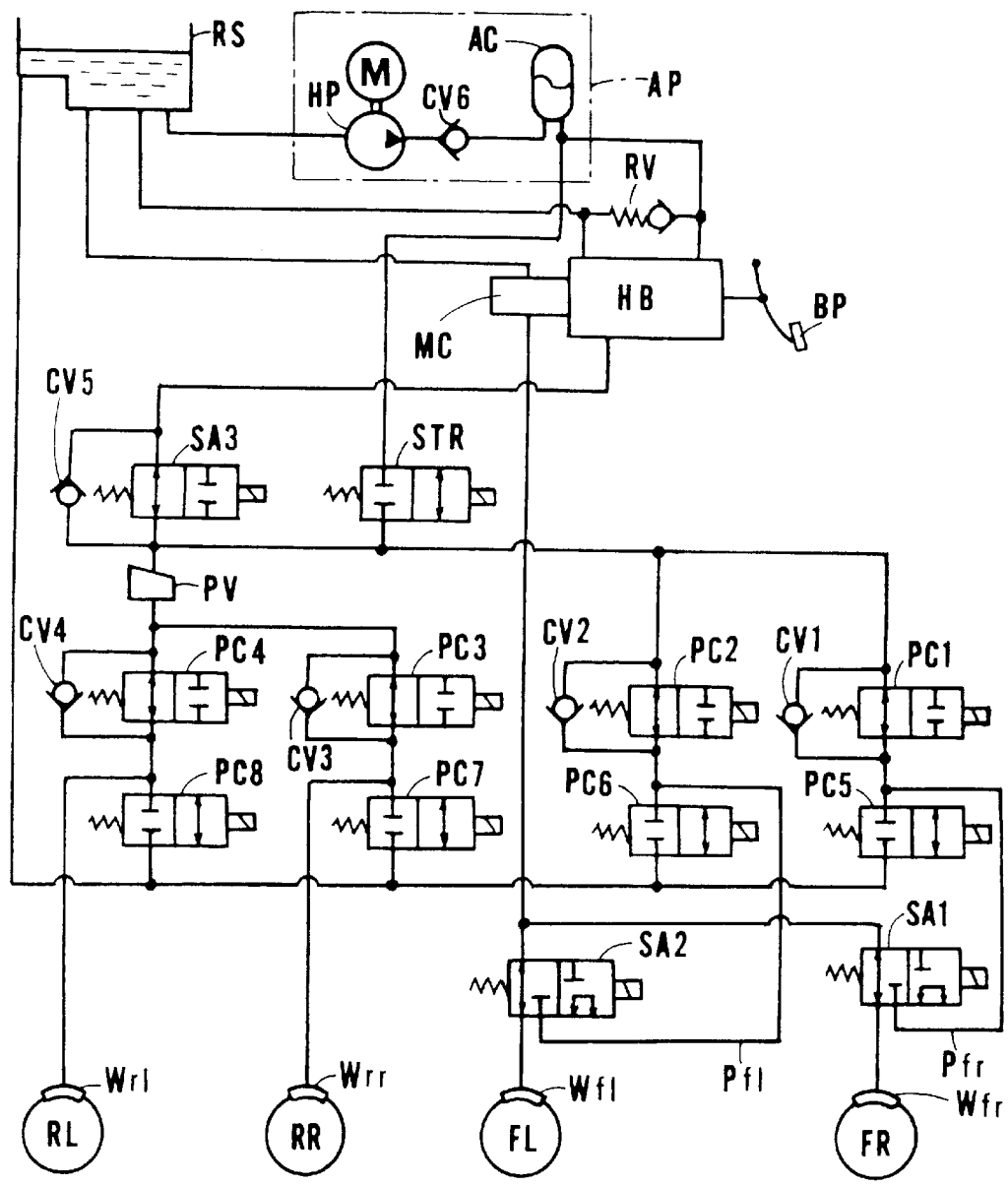
FIG. 10 is a diagram showing the relationship between the pressure control modes and parameters for use in the hydraulic braking pressure control according to the above embodiment.

With respect to a braking system according to the present embodiment, wheel brake cylinders Wfl, Wfr, Wrl, Wrr are operatively mounted on the front wheels FL, FR and rear wheels RL, RR of the vehicle, respectively, and which is fluidly connected to the braking control apparatus PC. The wheel FL designates the wheel at the front left side as viewed from the position of a driver's seat, the wheel FR designates the wheel at the front right side, the wheel RL designates the wheel at the rear left side, and the wheel RR designates the wheel at the rear right side. According to the present embodiment, a front-rear dual circuit system is employed, while a diagonal circuit system may be employed. The braking control apparatus PC is arranged to be actuated in response to depression of a brake pedal BP to control the hydraulic pressure supplied to each wheel brake cylinder, and may be selected from various known types. The braking control apparatus PC in the present embodiment may be arranged as illustrated in FIG. 10 which will be explained in detail.

As shown in FIG. 2, at the road wheels FL, FR, RL and RR, there are provided wheel speed sensors WS1 to WS4 respectively, which are connected to an electronic controller ECU, and by which a signal having pulses proportional to a rotational speed of each wheel, i.e., a wheel speed signal is fed to the electronic controller ECU. There are also provided a brake switch BS which turns on when the brake pedal BP is depressed, and turns off when the brake pedal BP is released, a front steering angle sensor SSf for detecting a steering angle δf of the front wheels FL, FR, a lateral acceleration sensor YG for detecting a vehicle lateral acceleration, and a yaw rate sensor YS for detecting a yaw rate of the vehicle. These are electrically connected to the electronic controller ECU. According to the yaw rate sensor YS, a varying rate of rotational angle of the vehicle about a normal on the center of gravity of the vehicle, i.e., a yaw angular velocity or yaw rate γ is detected and fed to the electronic controller ECU. The yaw rate γ may be calculated on the basis of a wheel speed difference Vfd between the wheel speeds of non-driven wheels (wheel speeds Vwfl, Vwfr of the front wheels FL, FR in the present embodiment), i.e., Vfd=Vwfr−Vwfl, so that the yaw rate sensor YS may be omitted. Furthermore, between the wheels RL and RR may be provided a steering angle control apparatus (not shown), which enables a motor (not shown) to control a steering angle of the wheels RL, RR in response to the output of the electronic controller ECU.

As shown in FIG. 2, the electronic controller ECU is provided with a microcomputer CMP which includes a central processing unit or CPU, a read-only memory or ROM, a random access memory or RAM, an input port IPT, an output port OPT and etc. The signals detected by each of the wheel speed sensors WS1 to WS4, brake switch BS, front steering angle sensor SSf, yaw rate sensor YS and lateral acceleration sensor YG are fed to the input port IPT via respective amplification circuits AMP and then to the central processing unit CPU. Then, control signals are fed from the output port OPT to the throttle control apparatus TH and braking control apparatus PC via the respective driving circuits ACT. In the microcomputer CMP, the read-only memory ROM memorizes a program corresponding to flowcharts shown in FIGS. 4 to 6, the central processing unit CPU executes the program while the ignition switch (not shown) is closed, and the random access memory RAM temporarily memorizes variable data needed to execute the program. A plurality of microcomputers may be provided for each control such as throttle control, or may be provided for performing various control modes, and electrically connected to each other.

Figure 3:
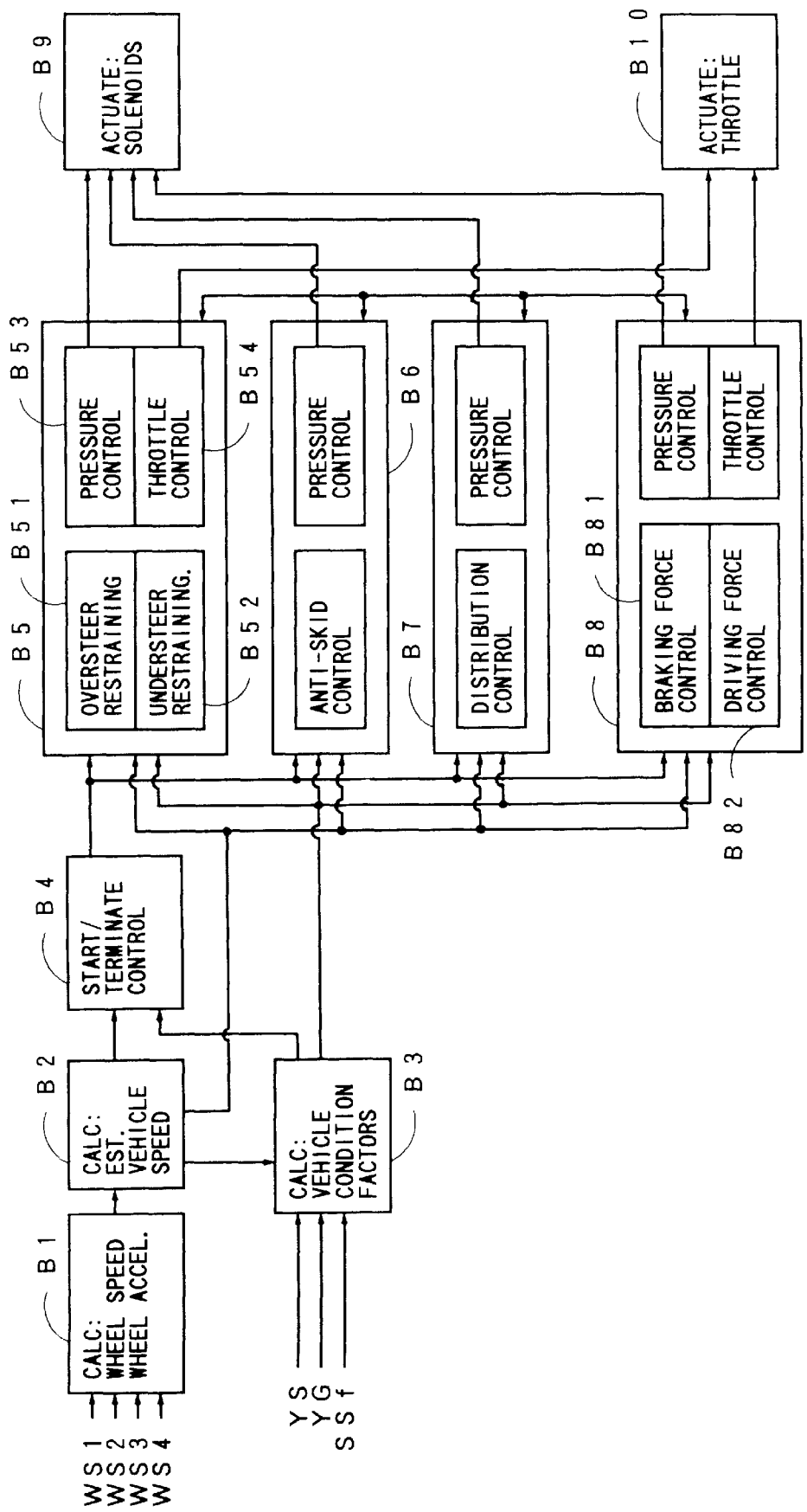
FIG. 3 is a diagram of blocks processed in the system of the above embodiment of the present invention.

FIG. 3 shows blocks processed in the microcomputer CMP. In a block B1, on the basis of the output signals of the wheel speed sensors WS1–WS4, a wheel speed Vw ( represents one of the wheels FL, FR, RL, RR) and a wheel acceleration DVw of each wheel are calculated, and on the basis of the results calculated in the block B1, an estimated vehicle speed Vso is calculated for each wheel in a block B2. In a block B3, various factors indicative of the vehicle condition are calculated on the basis of the output signals from the yaw rate sensor YS, lateral acceleration sensor YG, front steering angle sensor SSf and etc., then in a block B4 a start or terminating process is made with respect to various control modes for each wheel as explained hereinafter. Although the start or termination of each control mode has been described individually heretofore, the start or termination is actually made in the course of each control, as described later with respect to the start or termination of the anti-skid control.

Then, in a block B5, a steering control by braking is performed, so that an oversteer restraining control is performed in a block B51, and an understeer restraining control is performed in a block B52, in order to maintain a stability and a course trace performance of the vehicle during cornering. The oversteer restraining control is provided for applying a braking force to a front wheel located on the outside of the curve in the vehicle's path of motion, for example, and forcing the vehicle to turn in a direction toward the outside of the curve, so as to prevent an excessive oversteer from occurring during cornering, with various solenoid valves which will be described later in detail, in the hydraulic pressure control apparatus energized or de-energized in a block B9 through a block B53. On the other hand, the understeer restraining control is provided for applying the braking force to the front wheel located on the outside of the curve and both of the rear wheels, for example, and forcing the vehicle to turn in a direction toward the inside of the curve and reduce the vehicle speed, so as to prevent an excessive understeer from occurring during cornering. If necessary, a throttle control may be made further in a block B10 through a block B54, so as to maintain the desired vehicle turning motion.

In a block B6, an anti-skid control is performed as described later, so that a braking force applied to each wheel is controlled so as to prevent the wheel from being locked during the vehicle braking operation. In a block B7, a front-rear braking force distribution control is performed, so that a distribution between the braking force applied to the rear wheels and the braking force applied to the front wheels is controlled so as to maintain the vehicle stability during the vehicle braking operation. The solenoid valves in the hydraulic pressure control apparatus are energized or de-energized in a block B9 to perform the controls in the block B6 and block B7. Further, in a block B8, a traction control is performed, so that a braking force is applied to a driven wheel through a block B81 and the throttle control is performed in the block B10 through a block B82, so as to prevent the driven wheel from slipping during the vehicle driving operation.

Figure 4:
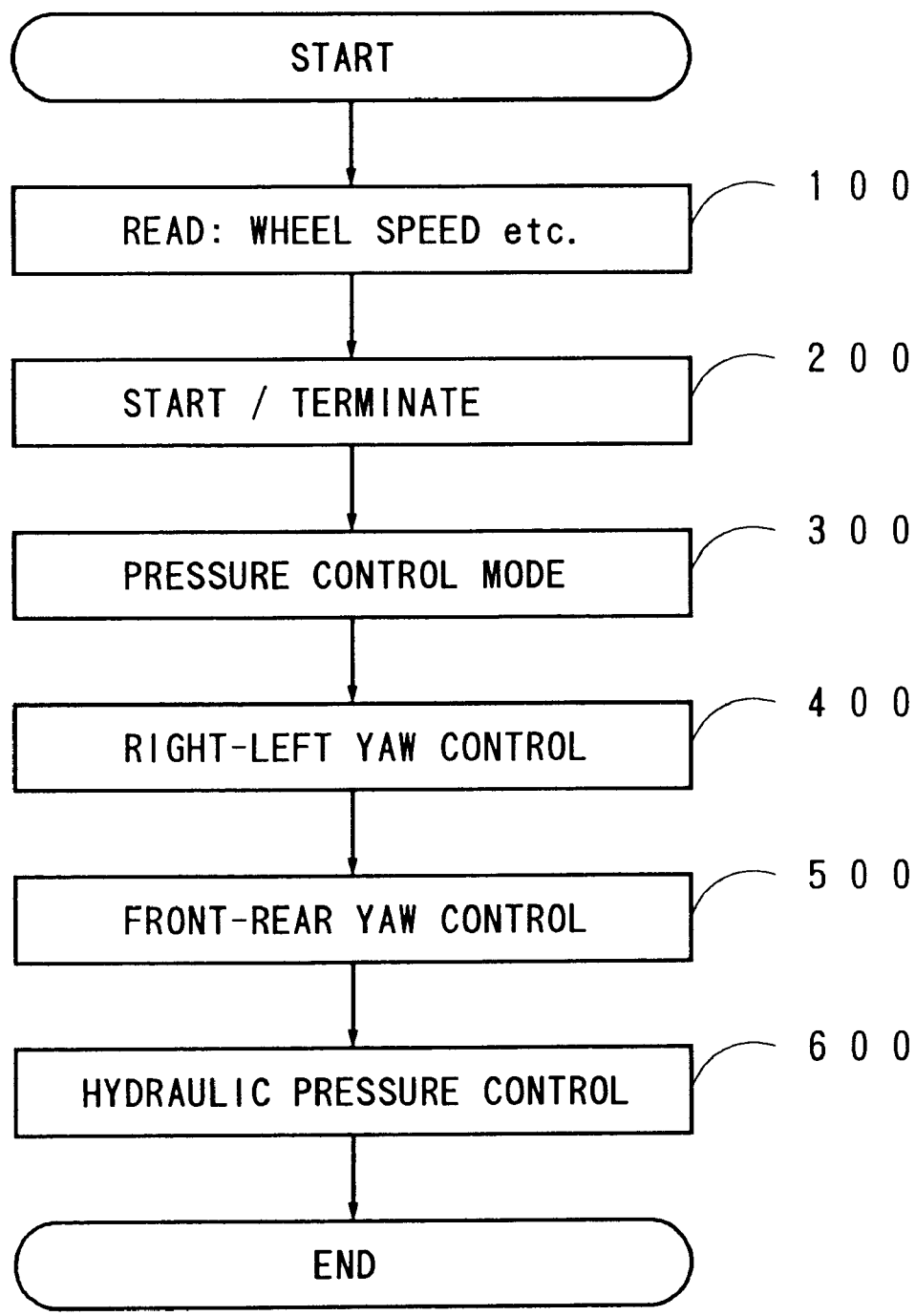
FIG. 4 is a flowchart showing an operation for an anti-skid control according to the above embodiment of the present invention.

According to the present embodiment as constituted above, a program routine for the vehicle motion control including the steering control by braking, anti-skid control and so on is executed by the electronic controller ECU, as will be described hereinafter with reference to FIGS. 4 to 6. The program routine starts when an ignition switch (not shown) is turned on. At the outset, the program for the vehicle motion control as shown in FIG. 4 provides for initialization of the system at Step 100 to clear various data. At Step 100, the signals detected by the wheel speed sensors WS1 to WS4 are read by the electronic controller ECU, and also read the signal (steering angle $\delta f$) detected by the front steering angle sensor SSf, the signal (actual yaw rate $\gamma$) detected by the yaw rate sensor YS, and the signal (actual lateral acceleration Gya) detected by the lateral acceleration sensor YG.

Figure 5:
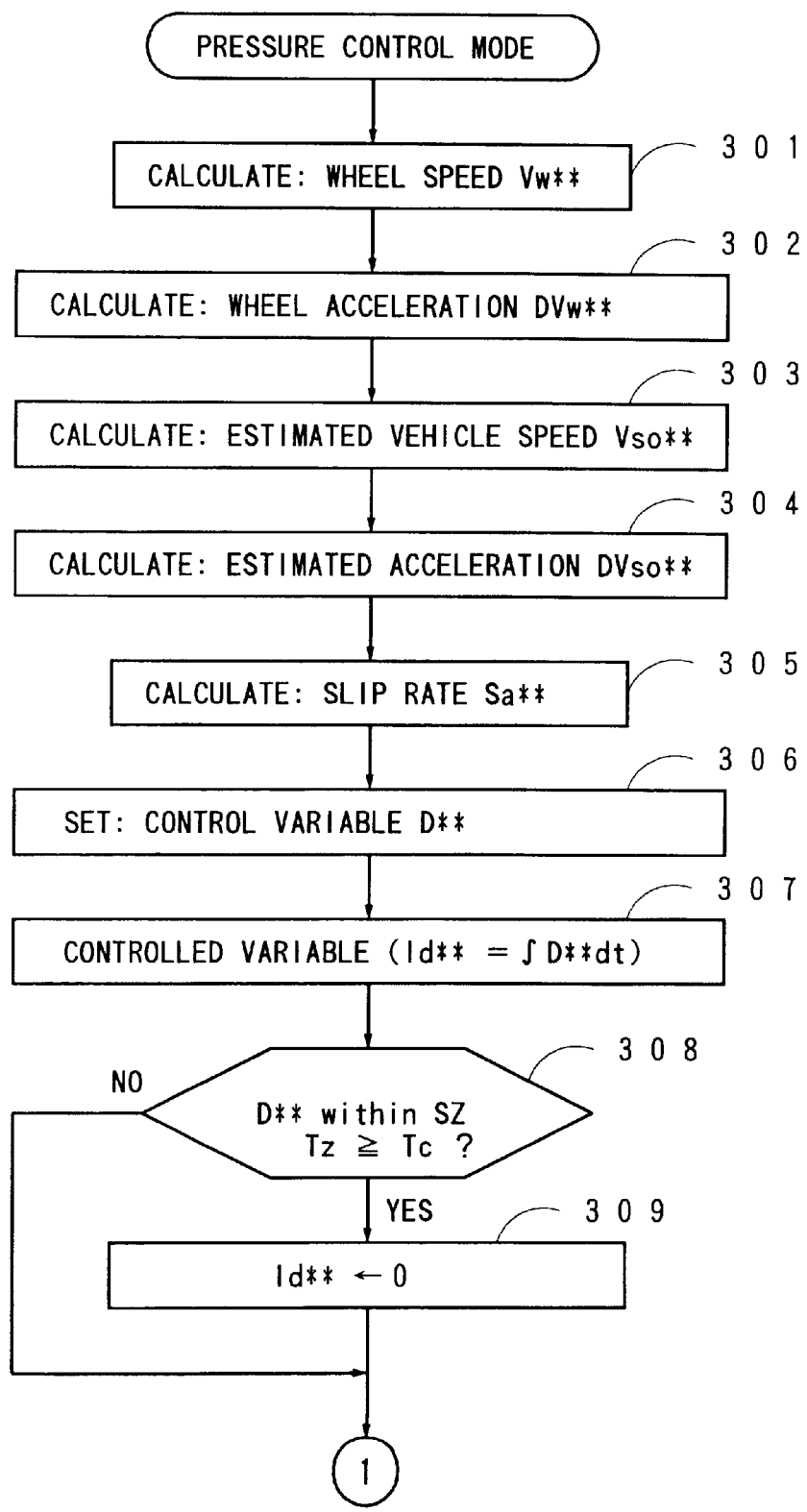
FIG. 5 is a flowchart showing an operation for setting a control mode according to the above embodiment of the present invention.
Figure 6:
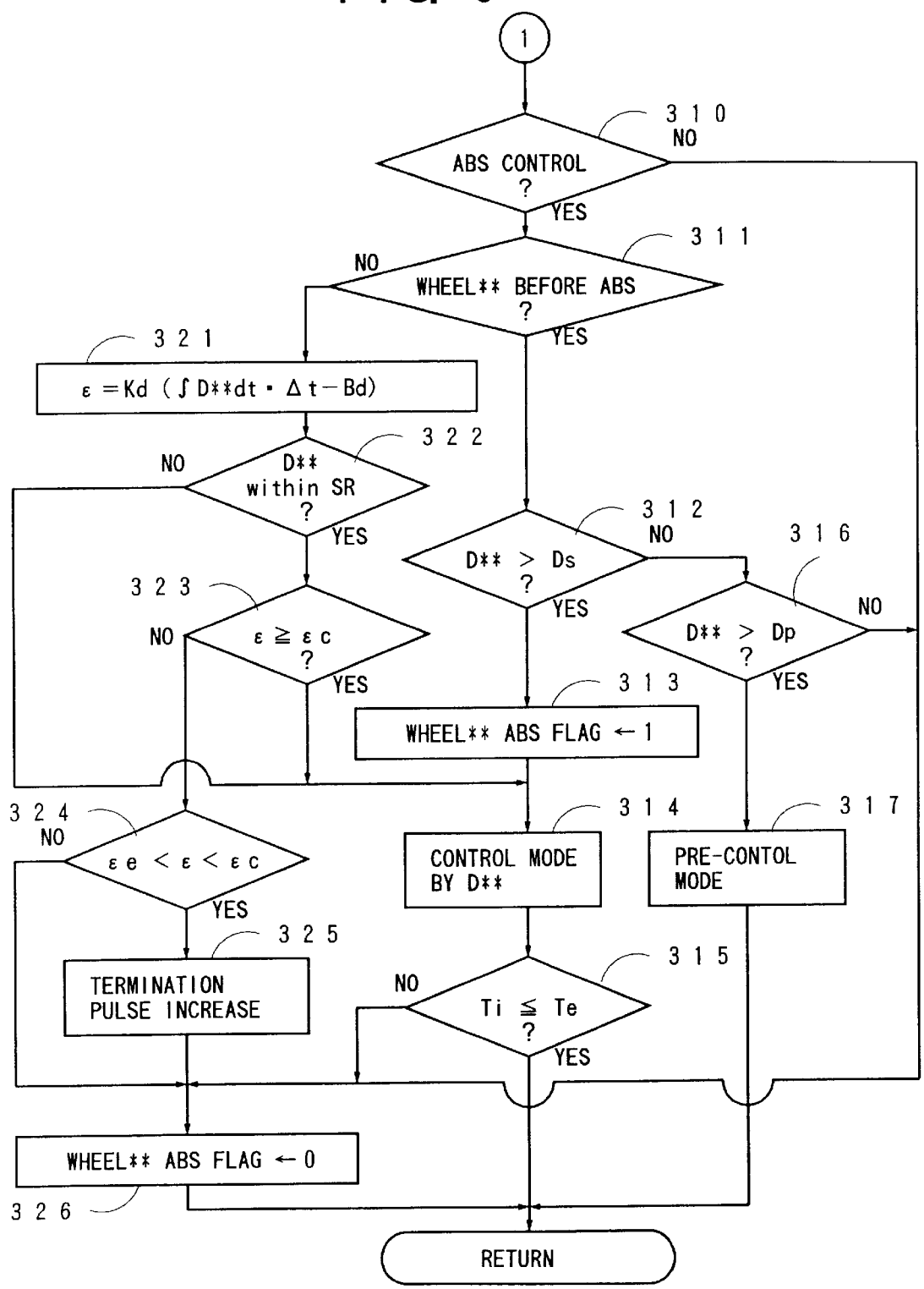
FIG. 6 is a flowchart showing an operation for setting a control mode according to the above embodiment of the present invention.

After the determination of the start or termination of the anti-skid control has been made, the program proceeds to Step 300 where a pressure control mode is set as shown in FIGS. 5 and 6. Then, after a right-left yaw control mode is set at step 400, and a front-rear yaw control mode is set at Step 500, the program proceeds to Step 600 where the hydraulic pressure in each wheel brake cylinder is controlled in accordance with a slip rate servo control, for example, on the basis of the pressure control mode set at Step 300, and with corrections made at Steps 400, 500. The right-left yaw control is a control for adjusting the braking force applied to the right and/or left wheels, in such a manner that when the anti-skid control is initiated with respect to one of the front right and front left wheels, the increasing rate of the braking force applied to the other of the wheels will be reduced by providing a pulse pressure increasing mode for the control of the hydraulic pressure in the wheel brake cylinder of the other wheel. For example, during the vehicle is running on a split road surface, if the vehicle is braked when one of the front wheels which is located on a road surface of a relatively low coefficient of friction and the other of the wheels which is located on a road surface of a relatively high coefficient of friction, the wheel located on the road surface of the lower coefficient of friction is about to be locked at first. Therefore, the hydraulic pressure in the wheel brake cylinder of the wheel which is located on the road surface of the lower coefficient of friction will be reduced to prevent the wheel from being locked. In this case, if the hydraulic pressure is applied, in response to depression of the brake pedal, to the wheel brake cylinder of the wheel which is located on the road surface of the higher coefficient of friction, a relatively large braking force will be applied to this wheel, so that the vehicle might be rotated. In order to prevent a rapid increase of the braking force from being applied to the wheel which is located on the road surface of the higher coefficient of friction, therefore, the right-left control provides the pulse pressure increasing mode to gradually increase the braking force. In other words, the braking force applied to the wheel which is located on the road surface of the higher coefficient of friction, is controlled to be reduced in advance, before the anti-skid control is initiated with respect to that wheel. In contrast to the steering control by braking, which is adapted to apply the braking force to the right and/or left wheels to control a yaw moment of the vehicle, the right-left yaw control is adapted to reduce the braking force applied to the right and/or left wheels to control the yaw moment of the vehicle, during the anti-skid control.

When either one of the front wheels is about to be locked thereby to start the anti-skid control with respect to that front wheel, it is presumed that one of the rear wheels is about to be locked immediately thereafter. Therefore, the front-rear yaw control is provided for restraining a rapid increase of the hydraulic pressure supplied to the wheel brake cylinders of the rear wheels. For example, when the anti-skid control is initiated with respect to one of the front wheels, the pulse pressure increasing mode will be provided for the control of the hydraulic pressure in the wheel brake cylinder of the rear wheel which is placed on the same side of the curve as the one front wheel. Consequently, the braking force will be applied gradually to the rear wheel without causing the rapid increase of the braking force, so that the wheel is prevented from being locked to keep the stability of the vehicle.

FIGS. 5 and 6 show a process for setting the pressure control mode executed at Step 300. At Step 301, a wheel speed Vw of each wheel is calculated on the basis of the signals detected by the wheel speed sensors WS1 to WS4, and further it is differentiated so as to provide a wheel acceleration DVw at Step 302. Then, at Step 303, an estimated vehicle speed Vso is calculated for each wheel on the basis of the wheel speed Vw. The estimated vehicle speed Vso may be calculated in accordance with the equation of Vso=MAX[Vw], for example. The estimated vehicle speed Vso is differentiated so as to provide an estimated vehicle acceleration DVso for each wheel, at Step 304. On the basis of the wheel speed Vw and the estimated vehicle speed Vso for each wheel, which are calculated at Steps 301 and 303, respectively, an actual slip rate Sa for each wheel is calculated in accordance with the following equation:

$$Sa^{}=(Vso^{}-Vw^{})/Vso^{}$$

Figure 7:
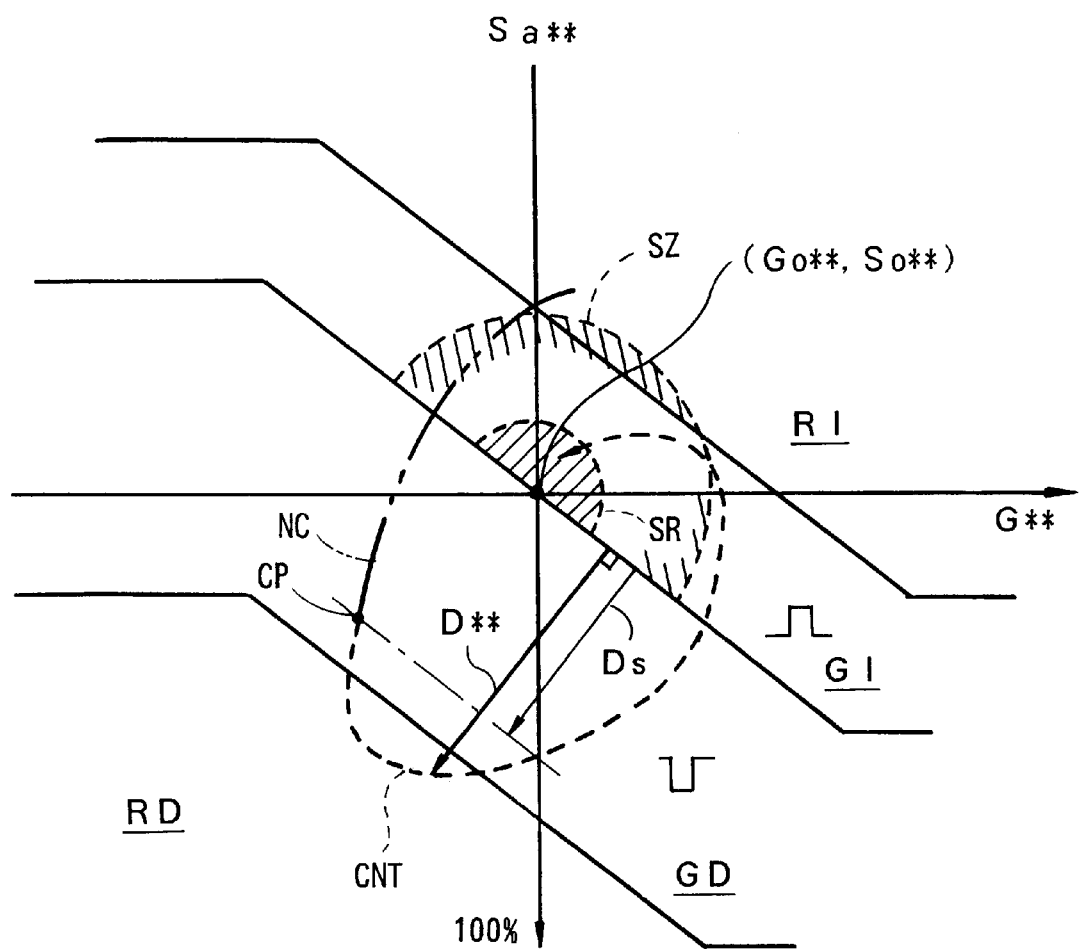
FIG. 7 is a diagram showing a control map for use in the anti-skid control according to the above embodiment of the present invention.

A pressure control mode for each wheel is provided in accordance with a control map as shown in FIG. 7. The control map has X-axis of G which corresponds to the wheel acceleration DVw obtained at Step 302, and Y-axis of the slip rate Sa obtained at Step 305. The control map has a reference line including the origin and a pair of lines in a parallel relationship with the reference line, on a plane of X-Y with the origin (Go, So**), by which four zones of a rapid pressure decreasing zone RD, a pulse pressure decreasing zone GD, a pulse pressure increasing zone GI, and a rapid pressure increasing zone RI are defined.

The reference wheel acceleration Go which serves as the origin is a value calculated by adding a dead zone, which is set as ΔGd when the wheel is not controlled, to the estimated vehicle acceleration DVso. The reference slip rate So** is a value calculated by adding a dead zone, which is set as ΔSd when the wheel is not controlled. These dead zones are varied in accordance with the control mode to be performed. For example, ΔSb and ΔGb are provided when the steering control by braking is performed. In lieu of the ΔGd and ΔSd which are provided when the wheel is not controlled, the pressure control mode may be changed when the wheel is not controlled, such that a gradual pressure decreasing mode may be substituted for a rapid pressure decreasing mode which is set as the pressure control mode, a gradual pressure increasing mode may be substituted for the gradual pressure decreasing mode which is set as the pressure control mode, or a rapid pressure increasing mode may be substituted for the gradual pressure increasing mode which is set as the pressure control mode, whereby a so-called NVH (Noise, Vibration and Harshness) can be reduced.

Accordingly, the program proceeds to Step 306 where a control variable D is provided in accordance with the wheel acceleration DVw and the slip rate Sa calculated at Steps 302 and 305, respectively. The control variable D corresponds to a length of a perpendicular from a random point to the reference line segment which lies on the origin as shown in FIG. 7. In other words, the control variable D** is equal to a distance from the reference line segment. The pulse pressure increasing mode and the rapid pressure increasing mode are provided in the zones GI and RI, respectively, at one side of the reference line segment, whereas the pulse pressure decreasing mode and the rapid pressure decreasing mode are provided in the zones GD and RD, respectively, at the other side of the reference line segment.

In the zones GI, GD, a period Tb and ON time of the pulse signal for the control mode are set. The period Tb is calculated in accordance with the following equation:

$$Tb=Kb-Kc \cdot D^{**}$$

where Kb, Kc are constants.

The program further proceeds to Step 307 where the control variable D is integrated to provide a controlled variable Id. That is, Id=∫D dt. Then, it is determined at Step 307 whether a time Tz, when the control variable D stays in a predetermined zone SZ which includes a stable zone SR, is equal to or more than a predetermined time Tc (e.g., 0.2 sec). If it is determined that the control variable D is out of the zone SZ, and that the time Tz when the control variable stays in the zone SZ is less than the predetermined time Tc, then the program proceeds to Step 310. Otherwise, the program proceeds to Step 309, where the controlled variable Id** is cleared to be zero.

Next, the program proceeds to Step 310 in FIG. 6, where it is determined if the anti-skid control (ABS) is permitted. If the result is negative, the program proceeds to Step 326 where an ABS control flag is reset (0), then returns to the routine as shown in FIG. 4, whereas if the result is affirmative, the program proceeds to the Steps following Step 311 where one of the control modes is selected. It is determined at Step 311 whether the anti-skid control has started with respect to a certain wheel (). If the anti-skid control has not started, the program proceeds to the Step 312 where it is determined whether the anti-skid control is to be started. That is, the control variable D is compared with a predetermined value Ds. If the control variable D is greater than the value Ds, the program proceeds to the Step 313 where the ABS control flag is set (1) to indicate that the anti-skid control is being performed with respect to the wheel (), so that one of the pressure control modes is selected in accordance with the control variable D at Step 314. Referring to FIG. 7, selected is one of the pressure control modes, which is provided for the zone in which the tip of the control variable D as shown in FIG. 7 is placed (e.g., the rapid pressure decreasing mode in FIG. 7). If the pulse pressure decreasing mode or pulse pressure increasing mode is selected, the period Tb of the pulse signal is determined in accordance with the control variable D**, as described before. Then, the program proceeds to Step 315 where a time Ti for continuing the pulse pressure increasing mode or the rapid pressure increasing mode is compared with a predetermined time Te. If the time Ti is equal to or less than the time Te, the program returns the main routine to continue the control. If the time Ti exceeds the time Te, the program proceeds to Step 326 where the ABS control flag is reset (0).

In the case where the control variable D is smaller than the value Ds, the program proceeds to Step 316 where the control variable D is further compared with a predetermined value Dp (<Ds). If the control variable D is greater than the value Dp, the program proceeds to Step 317 where a certain pre-control mode is provided, for example. Otherwise, the program proceeds to Step 326 where the ABS control flag is reset (0). At Step 317, however, the pre-control mode may be omitted, so that the control mode may be provided in accordance with the control variable D as done at Step 314.

In the case where it is determined at Step 311 that the anti-skid control has already started with respect to the wheel (), the program proceeds to Step 321 where a controlled variable ε is calculated. The controlled variable ε is calculated by multiplying the sum of an integrated value of the control variable D (i.e., ∫Ddt which is obtained as Id at Step 307) during a period of time Δt after the anti-skid control started, i.e., ∫D**dt·Δt, from which a bias Bd is subtracted, if necessary, by a constant Kd, so that the controlled variable ε corresponds to a so-called controlled energy. That is, the controlled variable ε is calculated in accordance with the following equation:

$$\epsilon = Kd(\int D^{**} dt \cdot \Delta t - Bd)$$

The controlled variable ε may be calculated by multiplying the difference between a master cylinder pressure Pm and a wheel cylinder pressure Pw by a constant Kp, i.e., Kp(Pm−Pw).

If it is determined at Step 322 that the control variable D is within the predetermined stable zone SR (hatching portion in FIG. 7), and determined at Steps 323, 324 that the controlled variable ε is less than a predetermined value "εe", which is a reference value for determining the termination of the control, then the anti-skid control is to be terminated with respect to the wheel (), so that the ABS control flag is reset (0) at Step 326. In other words, if it is determined at Step 323 that the controlled variable ε is equal to or greater than the predetermined value εe, the program proceeds to Step 314 where the pressure control performed in accordance with the control variable D is continued. If the controlled variable is less than a predetermined value "εc", which is a reference value for determining the continuation of the control, the program proceeds to Step 324 where the controlled variable ε is compared with the predetermined value εe for determining the termination of the control. If the controlled variable ε exceeds the predetermined value εe, the pulse pressure increasing mode for the termination is provided at Step 325, and then the ABS control flag is reset at Step 326. Thus, in the case where the period of time when the control variable D is greater than the predetermined value Ds is relatively long, the anti-skid control is continued. If the control variable D is out of the stable zone SR, the program proceeds to Step 314 where the pressure control performed in accordance with the control variable D is continued.

Figure 8:
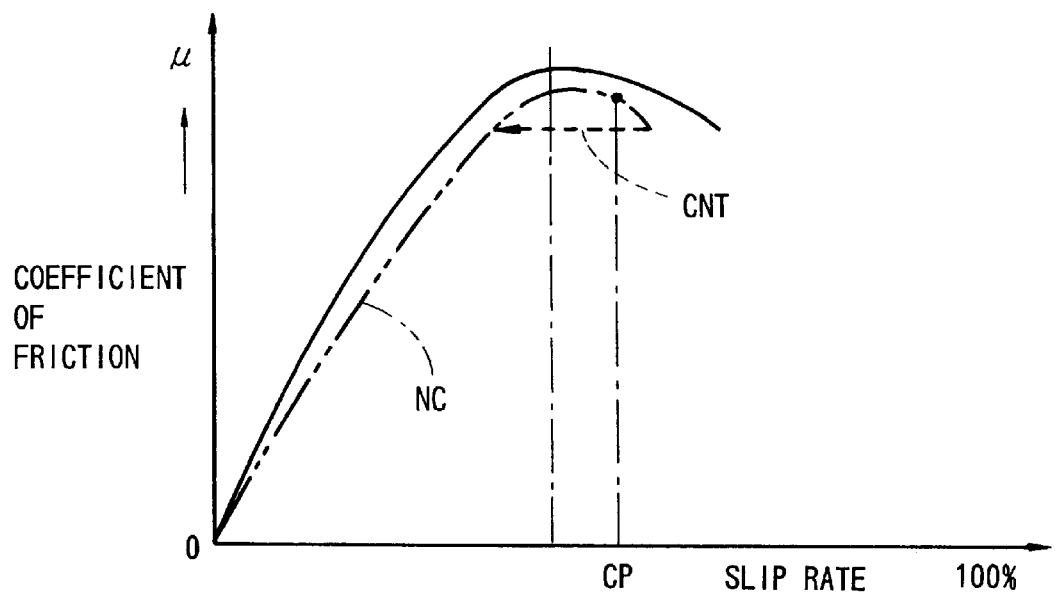
FIG. 8 is a graph showing a characteristic of a coefficient of friction and a slip rate.
Figure 9:
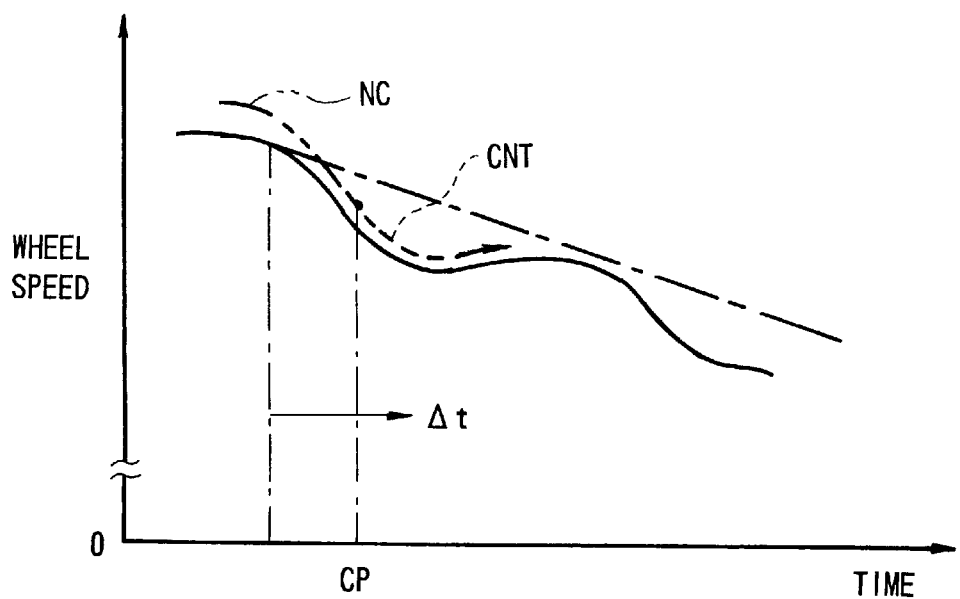
FIG. 9 is a graph showing a wheel speed controlled under the anti-skid control according to the above embodiment of the present invention.

Referring to FIGS. 7–9, the above-described operation will be explained, wherein the control variable D is always calculated. Even in case of a non-controlled condition (NC), i.e., during normal braking, as indicated by a two-dotted chain line, the control variable D is always calculated (at Step 306). If the control variable D exceeds the predetermined value Ds at a position CP, the anti-skid control will start (Steps 312, 313). Thereafter, the anti-skid control is continued, until when the control variable D is converged on the control target as indicated by a broken line in FIG. 7, and when it is determined at Step 326 that the control is to be terminated. The same control as described above may be applied to a rear wheels barking force distribution control, a traction control by barking and the steering control by braking, and the control of the driving force, as well. As a result, a desired control can be applied to the vehicle motion control as a whole, including the braking force control and the driving force control.

FIG. 10 shows an embodiment of the hydraulic braking braking control apparatus PC, which includes a master cylinder MC and a hydraulic booster HB which are activated in response to depression of the brake pedal BP. The hydraulic booster HB is connected to an auxiliary pressure source AP, both of which are connected to a low pressure reservoir RS, to which the master cylinder MC is connected, as well. The auxiliary pressure source AP includes a hydraulic pressure pump HP and an accumulator AC. The pump HP is driven by an electric motor M to pressurize a brake fluid in the reservoir RS to discharge the pressurized brake fluid, or hydraulic braking pressure through a check valve CV6, into the accumulator AC to accumulate it therein. The electric motor M starts to operate when the pressure in the accumulator AC is decreased to be less than a predetermined lower limit, and stops when the pressure in the accumulator AC is increased to exceed a predetermined upper limit. A relief valve RV is provided between the accumulator AC and the reservoir RS. Accordingly, it is so arranged that a so-called power pressure is properly supplied from the accumulator AC to the hydraulic booster HB. The hydraulic booster HB introduces the hydraulic braking pressure discharged from the auxiliary pressure source AP and regulates it to a boost pressure in proportion to a pilot pressure discharged from the master cylinder MC, which is boosted by the boost pressure.

In a hydraulic pressure circuit for connecting the master cylinder MC with each of the front wheel brake cylinders Wfr, Wfl, disposed are solenoid valves SA1 and SA2 which are connected to solenoid valves PC1, PC5 and solenoid valves PC2, PC6, through control passages Pfr and Pfl, respectively. In the hydraulic pressure circuits for connecting the hydraulic booster HB with each of the wheel brake cylinder Wrl and etc., a solenoid valve SA3, solenoid valves PC1–PC8 for use in the control of discharging and draining of the brake fluid are disposed, and a proportioning pressure decreasing valve PV is disposed at the rear wheels' side. Then, the auxiliary pressure source AP is connected to the downstream side of the solenoid valve SA3 through a solenoid valve STR. The hydraulic circuits are divided into the front circuit system and the rear circuit system as shown in FIG. 17 to form the front and rear dual circuit system according to the present embodiment.

With respect to the front hydraulic pressure circuit, the solenoid valves PC1 and PC2 are connected to the solenoid valve STR, which is of a two-port two-position solenoid operated valve normally closed and activated to communicate the solenoid valves PC1 and PC2 directly with the accumulator AC. The solenoid valves SA1 and SA2 are of a three-port two-position solenoid operated valve which is placed in a first operating position as shown in FIG. 17, when it is not energized, through which each of the wheel brake cylinders Wfr and Wfl is communicated with the master cylinder MC. When the solenoid valves SA1 and SA2 are energized, they are placed in their second operating positions, respectively, where both of the wheel brake cylinders Wfr and Wfl are prevented from communicating with the master cylinder MC, while the wheel brake cylinder Wfr is communicated with the solenoid valves PC1 and PC5, and the wheel brake cylinder Wfl is communicated with the solenoid valves PC2 and PC6, respectively. In parallel with the solenoid valves PC1 and PC2, check valves CV1 and CV2 are disposed, respectively. The inlet side of the check valve CV1 is connected to the passage Pfr, and the inlet side of the check valve CV2 is connected to the passage Pfl. The check valve CV1 is provided for allowing the flow of the brake fluid toward the hydraulic booster HB and preventing the reverse flow. In the case where the solenoid valve SA1 is energized to be placed in its second position, therefore, if the brake pedal BP is released, the hydraulic pressure in the wheel brake cylinder Wfr is rapidly reduced to the pressure discharged from the hydraulic booster HB. The check valve CV2 is provided in the same manner as the check valve CV1.

With respect to the rear hydraulic pressure circuit, the solenoid valve SA3 is of a two-port two-position solenoid operated valve, which is normally opened as shown in FIG. 17, so that the solenoid valves PC3 and PC4 are communicated with the hydraulic booster HB through the proportioning valve PV. In this case, the solenoid valve STR is placed in its closed position to shut off the communication with the accumulator AC. When the solenoid valve SA3 is energized, it is placed in its closed position, where both of the solenoid valves PC3 and PC4 are prevented from communicating with the hydraulic booster HB, while they are communicated with the solenoid valve STR through the proportioning valve PV, so that they are communicated with the accumulator AC when the solenoid valve STR is energized. In parallel with the solenoid valves PC3 and PC4, check valves CV3 and CV4 are disposed, respectively. The inlet side of the check valve CV3 is connected to the wheel brake cylinder Wrr, and the inlet side of the check valve CV4 is connected to the wheel brake cylinder Wrl. The check valves CV3 and CV4 are provided for allowing the flow of the brake fluid toward the solenoid valve SA3 and preventing the reverse flow. If the brake pedal BP is released, therefore, the hydraulic pressure in each of the wheel brake cylinders Wrr, Wrl is rapidly reduced to the pressure discharged from the hydraulic booster HB. Furthermore, the check valve CV5 is disposed in parallel with the solenoid valve SA3, so that the brake fluid may be supplied from the hydraulic booster HB to the wheel brake cylinders in response to depression of the brake pedal BP.

The above-described solenoid valves SA1, SA2, SA3, STR, and solenoid valves PC1–PC8 are controlled by the electronic controller ECU, so that the hydraulic pressure in each wheel cylinder is rapidly increased in the rapid pressure increasing zone, gradually increased in the pulse pressure increasing zone, gradually decreased in the pulse pressure decreasing zone, rapidly decreased in the rapid pressure decreasing zone, and held in the pressure holding zone. Accordingly, the anti-skid control and the like can be performed, as noted previously. For example, when the steering control by braking, which is to be executed irrespective of depression of the brake pedal BP, is performed, the hydraulic pressure is not discharged from the hydraulic booster HB and master cylinder MC. Therefore, the solenoid valves SA1 and SA2 are placed in their second positions, the solenoid valve SA3 is placed in its closed position, and then the solenoid valve STR is placed in its open position, so that the power pressure can be discharged to the wheel brake cylinder Wfr and so on, through the solenoid valve STR and any of the solenoid valves PC1–PC8 placed in their open positions. Consequently, with the solenoid valves PC1–PC8 energized or de-energized in response to vehicle motion, the hydraulic pressure in each wheel brake cylinder can be adjusted.

According to the above-described embodiment, any expensive pressure sensors are not needed because the slip rate is employed for the control, so that the system can be produced at a relatively low cost. If the system is provided with pressure sensors for detecting the master cylinder pressure and wheel brake cylinder pressure, the controlled variable ε may be obtained in accordance with the difference between the master cylinder pressure and wheel brake cylinder pressure, i.e., (Pm−Pw) as described before.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. A vehicle motion control system for maintaining stability of an automotive vehicle when said vehicle is in motion, by controlling a braking force applied to the front and rear wheels of said vehicle, comprising:

vehicle condition monitor means for monitoring a condition of said vehicle in motion;

braking means for applying a braking force to each wheel of said vehicle, said braking means being actuated in response to depression of a brake pedal, and said braking means being actuated on the basis of an output of said monitor means and irrespective of depression of said brake pedal;

control variable setting means for setting a control variable for actuating said braking means, in accordance with at least a first parameter and a second parameter provided on the basis of the output of said monitor means, respectively, the control variable being varied in response to the output of said vehicle condition monitor means;

controlled variable calculating means for integrating the control variable varied in response to the output of said monitor means, while said braking means is actuated, to provide a controlled variable;

starting means for starting the actuation of said braking means when the control variable varied in response to the output of said monitor means exceeds a predetermined level in magnitude; and terminating means for determining if the control variable varied in response to the output of said monitor means is within a predetermined zone provided in accordance with the first parameter and the second parameter, and for terminating the actuation of said braking means when the control variable is within the predetermined zone, and when the controlled variable provided by said controlled variable calculating means is less than a predetermined value.

2. The vehicle motion control system as claimed in claim 1, wherein said vehicle condition monitor means includes:

wheel speed detection means for detecting a wheel speed of each wheel of said front and rear wheels;

wheel acceleration calculating means for calculating a wheel acceleration of each wheel of said wheels on the basis of an output of said wheel speed detection means; and slip rate calculating means for calculating a slip rate of each wheel of said wheels on the basis of the output of said wheel speed detection means, and wherein the wheel acceleration is provided for the first parameter, and the slip rate is provided for the second parameter.

3. The vehicle motion control system as claimed in claim 2, wherein said control variable setting means provides an X-axis for the wheel acceleration and provides a Y-axis for the slip rate to form a control map of an X-Y coordinate plane having an origin which is determined on the basis of a reference wheel acceleration and a reference slip rate provided in accordance with a control mode to be performed, and provides a reference line lying on the origin of the X-Y coordinate plane, and wherein said control variable setting means sets the control variable corresponding to a distance from a position on the X-Y coordinate plane to the reference line, the position being determined on the basis of the wheel acceleration and the slip rate for each wheel calculated by said wheel acceleration calculating means and said slip rate calculating means, respectively.

4. The vehicle motion control system as claimed in claim 3, wherein said terminating means provides the predetermined zone on the X-Y coordinate plane to abut on the reference line.

5. The vehicle motion control system as claimed in claim 3, wherein said controlled variable calculating means integrates the control variable, and calculates the sum of the integrated value of the control variable during a period of time after said control mode started, to provide the controlled variable.

6. The vehicle motion control system as claimed in claim 3, wherein said braking means comprises:

wheel brake cylinders operatively connected to said front and rear wheels for applying the braking force thereto, respectively;

a hydraulic pressure generator for supplying a hydraulic pressure to said wheel braking cylinders; and actuating means disposed between said hydraulic pressure generator and said wheel brake cylinders for controlling the hydraulic pressure in said wheel brake cylinders in response to the output of said monitor means.

7. The vehicle motion control system as claimed in claim 6, wherein said control variable setting means provides a pair of lines in parallel with the reference line to define a pair of zones at both sides of the reference line, respectively, said zones corresponding to a rapid pressure increasing zone and a gradual pressure increasing zone at one side of the reference line, and corresponding to a rapid pressure decreasing zone and a gradual pressure decreasing zone at the other side of the reference line, and wherein said actuating means is actuated in accordance with one of the zones in which the position of the control variable determined on the basis of the wheel acceleration and the slip rate for each wheel stays.

* * * * *